US010362133B1

(12) United States Patent
Maag et al.

(10) Patent No.: US 10,362,133 B1
(45) Date of Patent: Jul. 23, 2019

(54) COMMUNICATION DATA PROCESSING ARCHITECTURE

(71) Applicant: Palantir Technologies Inc., Palo Alto, CA (US)

(72) Inventors: Peter Maag, New York, NY (US); Tom O'Brien, New York, NY (US); Peter Tosirisuk, Oakland, CA (US); Saad Abdali, Abu Dhabi (AE); Carl Freeland, Mountain View, CA (US); Greg DeArment, Seattle, WA (US); Maciej Albin, London (GB); Matthew Lynch, New York, NY (US); Phillip Worton-Cross, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 429 days.

(21) Appl. No.: 14/750,773

(22) Filed: Jun. 25, 2015

Related U.S. Application Data

(60) Provisional application No. 62/095,655, filed on Dec. 22, 2014.

(51) Int. Cl.
*H04L 29/08* (2006.01)
*H04L 29/06* (2006.01)

(52) U.S. Cl.
CPC .......... *H04L 67/2828* (2013.01); *H04L 67/06* (2013.01); *H04L 67/42* (2013.01)

(58) Field of Classification Search
CPC ........ G06Q 30/02; G06Q 50/18; G06Q 10/10; G06F 17/30628; G06F 17/30705; G06F 17/30153; G06F 17/30569; G06F 17/30371
See application file for complete search history.

(56) References Cited

U.S. PATENT DOCUMENTS

| 5,109,399 A | 4/1992 | Thompson |
| 5,329,108 A | 7/1994 | Lamoure |
| 5,632,987 A | 5/1997 | Rao et al. |
| 5,670,987 A | 9/1997 | Doi et al. |
| 5,724,575 A | 3/1998 | Hoover et al. |

(Continued)

FOREIGN PATENT DOCUMENTS

| CN | 102546446 | 7/2012 |
| CN | 103167093 | 6/2013 |

(Continued)

OTHER PUBLICATIONS

US 8,712,906 B1, 04/2014, Sprague et al. (withdrawn)

(Continued)

*Primary Examiner* — Philip J Chea
*Assistant Examiner* — Mohammed Ahmed
(74) *Attorney, Agent, or Firm* — Knobbe Martens Olson & Bear LLP

(57) ABSTRACT

Various systems and methods are provided that allow reviewers to review and potentially flag processed communication data in order to spot potential malfeasance or illegal activity. Certain systems and methods includes modules for removing duplicate data from the communication data files, generating thread data for email data files, generating lexicon tag data for the data files, removing blacklisted data that meets blacklisted criteria, or generating group association data.

23 Claims, 9 Drawing Sheets

(56) References Cited

U.S. PATENT DOCUMENTS

| | | |
|---|---|---|
| 5,781,704 A | 7/1998 | Rossmo |
| 5,798,769 A | 8/1998 | Chiu et al. |
| 5,845,300 A | 12/1998 | Comer |
| 5,872,973 A | 2/1999 | Mitchell et al. |
| 5,897,636 A | 4/1999 | Kaeser |
| 6,057,757 A | 5/2000 | Arrowsmith et al. |
| 6,073,129 A | 6/2000 | Levine et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,418,438 B1 | 7/2002 | Campbell |
| 6,430,305 B1 | 8/2002 | Decker |
| 6,456,997 B1 | 9/2002 | Shukla |
| 6,505,196 B2 | 1/2003 | Drucker et al. |
| 6,510,504 B2 | 1/2003 | Satyanarayana |
| 6,523,019 B1 | 2/2003 | Borthwick |
| 6,549,944 B1 | 4/2003 | Weinberg et al. |
| 6,560,620 B1 | 5/2003 | Ching |
| 6,567,936 B1 | 5/2003 | Yang et al. |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,745,382 B1 | 6/2004 | Zothner |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Joseph |
| 7,418,431 B1 | 8/2008 | Nies et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B2 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,813,937 B1 | 10/2010 | Pathria et al. |
| 7,814,102 B2 | 10/2010 | Miller et al. |
| 7,818,658 B2 | 10/2010 | Chen |
| 7,827,045 B2 | 11/2010 | Madill et al. |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,214,232 B2 | 7/2012 | Tyler et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,364,642 B1 | 1/2013 | Garrod |
| 8,368,695 B2 | 2/2013 | Howell et al. |
| 8,397,171 B2 | 3/2013 | Klassen et al. |
| 8,412,707 B1 | 4/2013 | Mianji |
| 8,447,674 B2 | 5/2013 | Choudhuri et al. |

(56) References Cited

U.S. PATENT DOCUMENTS

| | | | |
|---|---|---|---|
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,494,984 B2 | 7/2013 | Hwang et al. |
| 8,495,077 B2 | 7/2013 | Bayliss |
| 8,498,969 B2 | 7/2013 | Bayliss |
| 8,504,542 B2 | 8/2013 | Chang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,578,500 B2 | 11/2013 | Long |
| 8,589,273 B2 | 11/2013 | Creeden et al. |
| 8,595,234 B2 | 11/2013 | Siripurapu et al. |
| 8,600,872 B1 | 12/2013 | Yan |
| 8,620,641 B2 | 12/2013 | Farnsworth et al. |
| 8,639,522 B2 | 1/2014 | Pathria et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,799,799 B1 | 5/2014 | Cervelli et al. |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,116,975 B2 | 8/2015 | Shankar et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,230,280 B1 | 1/2016 | Maag et al. |
| 9,256,664 B2 | 2/2016 | Chakerian et al. |
| 2001/0051949 A1 | 12/2001 | Carey et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091694 A1 | 7/2002 | Hrle et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0163039 A1 | 8/2004 | McPherson et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2005/0010472 A1 | 1/2005 | Quatse et al. |
| 2005/0021886 A1* | 1/2005 | Adema ............... G06F 9/4443 710/33 |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0080769 A1 | 4/2005 | Gemmell |
| 2005/0086207 A1 | 4/2005 | Heuer et al. |
| 2005/0097441 A1 | 5/2005 | Herbach et al. |
| 2005/0108063 A1 | 5/2005 | Madill et al. |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0036593 A1* | 2/2006 | Dean ............... G06F 17/3061 |
| 2006/0059139 A1 | 3/2006 | Robinson |
| 2006/0074881 A1 | 4/2006 | Vembu et al. |
| 2006/0080316 A1 | 4/2006 | Gilmore et al. |
| 2006/0080619 A1 | 4/2006 | Carlson et al. |
| 2006/0095521 A1 | 5/2006 | Patinkin |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0203337 A1 | 9/2006 | White |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |

(56) References Cited

U.S. PATENT DOCUMENTS

| | | |
|---|---|---|
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0143253 A1 | 6/2007 | Kostamaa et al. |
| 2007/0150369 A1 | 6/2007 | Zivin |
| 2007/0174760 A1 | 7/2007 | Chamberlain et al. |
| 2007/0192143 A1 | 8/2007 | Krishnan et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0294643 A1 | 12/2007 | Kyle |
| 2007/0299697 A1 | 12/2007 | Friedlander et al. |
| 2008/0015970 A1 | 1/2008 | Brookfield et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0104149 A1 | 5/2008 | Vishniac et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0044279 A1 | 2/2009 | Crawford et al. |
| 2009/0055251 A1 | 2/2009 | Shah et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2010/0011282 A1 | 1/2010 | Dollard et al. |
| 2010/0036831 A1 | 2/2010 | Vemuri et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0077483 A1 | 3/2010 | Stolfo et al. |
| 2010/0082541 A1 | 4/2010 | Kottomtharayil |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0115396 A1* | 5/2010 | Byron ............ G06F 17/30873 715/234 |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0161735 A1 | 6/2010 | Sharma |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |

(56) References Cited

U.S. PATENT DOCUMENTS

| | | |
|---|---|---|
| 2010/0250412 A1 | 9/2010 | Wagner |
| 2010/0250503 A1* | 9/2010 | Andersen ............... G06Q 30/02 707/692 |
| 2010/0250624 A1* | 9/2010 | Mayer .................... G06Q 10/10 707/809 |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167493 A1 | 7/2011 | Song et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0178842 A1 | 7/2011 | Rane et al. |
| 2011/0184813 A1 | 7/2011 | Barne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0258158 A1 | 10/2011 | Resende et al. |
| 2011/0258242 A1 | 10/2011 | Eidson et al. |
| 2011/0270604 A1 | 11/2011 | Qi et al. |
| 2011/0270705 A1 | 11/2011 | Parker |
| 2011/0270812 A1 | 11/2011 | Ruby |
| 2011/0289397 A1 | 11/2011 | Eastmond et al. |
| 2011/0289407 A1 | 11/2011 | Naik et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2012/0004904 A1 | 1/2012 | Shin et al. |
| 2012/0011238 A1 | 1/2012 | Rathod |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0150791 A1 | 6/2012 | Willson |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323888 A1 | 12/2012 | Osann, Jr. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0036346 A1 | 2/2013 | Cicerone |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |

(56) References Cited

U.S. PATENT DOCUMENTS

| | | |
|---|---|---|
| 2013/0268520 A1 | 10/2013 | Fisher et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0058754 A1 | 2/2014 | Wild |
| 2014/0058763 A1 | 2/2014 | Zizzamia et al. |
| 2014/0059038 A1 | 2/2014 | McPherson et al. |
| 2014/0068487 A1 | 3/2014 | Steiger et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136237 A1 | 5/2014 | Anderson et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222793 A1 | 8/2014 | Sadkin et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344231 A1 | 11/2014 | Stowe et al. |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0227295 A1 | 8/2015 | Meiklejohn et al. |
| 2015/0235334 A1 | 8/2015 | Wang et al. |
| 2015/0261817 A1 | 9/2015 | Harris et al. |
| 2016/0004764 A1 | 1/2016 | Chakerian et al. |
| 2016/0034470 A1 | 2/2016 | Sprague et al. |
| 2016/0048937 A1 | 2/2016 | Mathura et al. |

FOREIGN PATENT DOCUMENTS

| | | |
|---|---|---|
| CN | 102054015 | 5/2014 |
| DE | 102014103476 | 9/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1191463 | 3/2002 |
| EP | 1672527 | 6/2006 |
| EP | 2551799 | 1/2013 |
| EP | 2555126 | 2/2013 |
| EP | 2555153 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2892197 | 7/2015 |
| EP | 2911078 | 8/2015 |
| EP | 2963577 | 1/2016 |
| GB | 2514239 | 11/2014 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 2005/104736 | 11/2005 |
| WO | WO 2008/011728 | 1/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Amnet, "5 Great Tools for Visualizing Your Twitter Followers," posted Aug. 4, 2010, http://www.amnetblog.com/component/content/article/115-5-grate-tools-for-visualizino-your-twitter-followers.html.

Ananiev et al., "The New Modality API," http://web.archive.org/web/20061211011958/http://java.sun.com/developer/technicalArticies/J2SE/Desktop/javase6/modality/ Jan. 21, 2006, pp. 8.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Bluttman et al., "Excel Formulas and Functions for Dummies," 2005, Wiley Publishing, Inc., pp. 280, 284-286.

(56) References Cited

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn et al., "Semi-supervised Clustering with User Feedback," Constrained Clustering: Advances in Algorithms, Theory, and Applications 4.1, 2003, pp. 17-32.
Conner, Nancy, "Google Apps: The Missing Manual," May 1, 2008, pp. 15.
Countly Mobile Analytics, http://count.ly/ Printed Jul. 18, 2013 in 9 pages.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
DISTIMO—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, http://www.flurry.com/ Printed Jul. 18, 2013 in 14 pages.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services" HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-

(56) References Cited

OTHER PUBLICATIONS dive-with-the-new-google-maps-for-desktop-with-google-earth-integration-its-more-than-just-a-utility/.
Open Web Analytics (OWA), http://www.openwebanalytics.com/ Printed Jul. 19, 2013 in 5 pages.
Palmas et al., "An Edge-Bunding Layout for Interactive Parallel Coordinates" 2014 IEEE Pacific Visualization Symposium, pp. 57-64.
Piwik—Free Web Analytics Software. http://piwik.org/ Printed Jul. 19, 2013 in18 pages.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," http://searchdatamanagement.techtarget.com/definition/OLAP-cube, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
"The FASTA Program Package," fasta-36.3.4, Mar. 25, 2011, pp. 29.
Trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines," M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Notice of Allowance for U.S. Appl. No. 14/616,080 dated Apr. 2, 2015.
Notice of Allowance for U.S. Appl. No. 14/486,991 dated May 1, 2015.
Notice of Allowance for U.S. Appl. No. 14/225,084 dated May 4, 2015.
Notice of Allowance for U.S. Appl. No. 14/504,103 dated May 18, 2015.
Notice of Allowance for U.S. Appl. No. 14/479,863 dated Mar. 31, 2015.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for New Zealand Patent Application No. 628840 dated Aug. 28, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for European Patent Application No. 14180281.9 dated Jan. 26, 2015.
Official Communication for European Patent Application No. 14187996.5 dated Feb. 12, 2015.
Official Communication for European Patent Application No. 14180142.3 dated Feb. 6, 2015.
Official Communication for European Patent Application No. 14186225.0 dated Feb. 13, 2015.
Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14189802.3 dated May 11, 2015.
Official Communication for European Patent Application No. 14191540.5 dated May 27, 2015.
Official Communication for Australian Patent Application No. 2014213553 dated May 7, 2015.
Official Communication for Netherlands Patent Application No. 2013306 dated Apr. 24, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014250678 dated Jun. 17, 2015.
Official Communication for European Patent Application No. 14180432.8 dated Jun. 23, 2015.

(56) References Cited

OTHER PUBLICATIONS

Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.
Official Communication for New Zealand Patent Application No. 622473 dated Mar. 27, 2014.
Official Communication for New Zealand Patent Application No. 622473 dated Jun. 19, 2014.
Official Communication for Great Britain Patent Application No. 1404486.1 dated May 21, 2015.
Official Communication for Great Britain Patent Application No. 1404489.5 dated May 21, 2015.
Official Communication for European Patent Application No. 14200298.9 dated May 13, 2015.
Official Communication for Great Britain Patent Application No. 1404499.4 dated Jun. 11, 2015.
Official Communication for Great Britain Patent Application No. 1404573.6 dated Sep. 10, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 13/831,791 dated Mar. 4, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 13/247,987 dated Apr. 2, 2015.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/639,606 dated May 18, 2015.
Official Communication for U.S. Appl. No. 14/579,752 dated May 26, 2015.
Official Communication for U.S. Appl. No. 14/306,154 dated May 15, 2015.
Official Communication for U.S. Appl. No. 14/289,599 dated May 29, 2015.
Official Communication for U.S. Appl. No. 14/225,160 dated May 20, 2015.
Official Communication for U.S. Appl. No. 14/306,138 dated May 26, 2015.
Official Communication for U.S. Appl. No. 14/289,596 dated Apr. 30, 2015.
Official Communication for U.S. Appl. No. 14/319,765 dated Jun. 16, 2015.
Official Communication for U.S. Appl. No. 13/835,688 dated Jun. 17, 2015.
Official Communication for U.S. Appl. No. 14/323,935 dated Jun. 22, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/571,098 dated Mar. 11, 2015.
Official Communication for U.S. Appl. No. 14/463,615 dated May 21, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/170,562 dated Sep. 25, 2014.
Official Communication for U.S. Appl. No. 14/449,083 dated Oct. 2, 2014.
Official Communication for U.S. Appl. No. 14/449,083 dated Mar. 12, 2015.

(56) References Cited

OTHER PUBLICATIONS

Official Communication for U.S. Appl. No. 13/949,043 dated May 7, 2015.
Official Communication for U.S. Appl. No. 14/518,757 dated Apr. 2, 2015.
Alfred, Rayner "Summarizing Relational Data Using Semi-Supervised Genetic Algorithm-Based Clustering Techniques", Journal of Computer Science, 2010, vol. 6, No. 7, pp. 775-784.
Anonymous, "BackTult—JD Edwards One World Version Control System", in 1 page, Jul. 23, 2007.
Antoshenkov, Gennady, "Dictionary-Based Order-Preserving String Compression", The VLDB Journal, pp. 26-39, 1997.
"The Apache Cassandra Project," http://cassandra.apache.org/ Printed Sep. 14, 2011 in 3 pages.
"Apache HBase," http://hbase.apache.org/ printed Sep. 14, 2011 in 1 page.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Chang et al., "Bigtable: A Distributed Storage System for Structured Data", Google, Inc., OSDI'06: Seventh Symposium on Operating System Design and Implementation, Seattle, WA, Nov. 2006.
Devanbu et al., "Authentic Third-party Data Publication", http://www.cs.ucdavis.edu/~devanbu/authdbpub.pdf, p. 19, 2000.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Elmasri et al., "Fundamentals of Database Systems", Fourth Edition, pp. 455-491, 2004.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontology Management System (Design)", Information Societies Technology Programme, pp. 1-27.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
"Money Laundering Risks and E-Gaming: A European Overview and Assessment," 2009, http://www.cf.ac.uk/socsi/resources/Levi_Final_Money_Laundering_Risks_egaming.pdf.
Niepert et al., "A Dynamic Ontology for a Dynamic Reference Work", Joint Conference on Digital Libraries, pp. 1-10, Vancouver, British Columbia, Jun. 17-22, 2007.
Nolan et al., "MCARTA: A Malicious Code Automated Run-Time Analysis Framework," Homeland Security (HST) 2012 IEEE Conference on Technologies for, Nov. 13, 2012, pp. 13-17.
Peng et al., "Large-scale Incremental Processing Using Distributed Transactions and Notifications", Proceedings of the 9th USENIX Symposium on Operating Systems Design and Implementation, USENIX, p. 14, 2010.
Perdisci et al., "Behavioral Clustering of HTTP-Based Malware and Signature Generation Using Malicious Network Traces," USENIX, Mar. 18, 2010, pp. 1-14.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Symantec Corporation, "E-Security Begins with Sound Security Policies," Announcement Symantec, Jun. 14, 2001.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
"Using Whois Based Geolocation and Google Maps API for Support Cybercrime Investigations," http://wseas.us/e-library/conferences/2013/Dubrovnik/TELECIRC/TELECIRC-32.pdf.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wollrath et al., "A Distributed Object Model for the Java System", Conference on Object-Oriented Technologies and Systems, pp. 219-231, Jun. 17-21, 1996.
International Search Report for International Patent Application No. PCT/US2008/054511 dated Jul. 31, 2008.
Notice of Allowance for U.S. Appl. No. 13/826,228 dated Mar. 27, 2015.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/451,221 dated Aug. 4, 2015.
Notice of Allowance for U.S. Appl. No. 14/473,552 dated Jul. 24, 2015.
Official Communication for Canadian Patent Application No. 2,677,464 dated Jan. 16, 2013.
Official Communication for Canadian Patent Application No. 2,677,464 dated Mar. 19, 2012.
Official Communication for European Patent Application No. 08730336.8 dated Jun. 6, 2012.
Official Communication for European Patent Application No. 12182274.6 dated Nov. 5, 2012.
Official Communication for European Patent Application No. 13157474.1 dated May 28, 2013.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175151.8 dated Nov. 25, 2015.
Official Communication for European Patent Application No. 15180515.7 dated Dec. 14, 2015.
Official Communication for New Zealand Patent Application No. 622181 dated Mar. 24, 2014.
Official Communication for U.S. Appl. No. 13/196,788 dated Oct. 23, 2015.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jul. 22, 2014.
Official Communication for U.S. Appl. No. 14/278,963 dated Jan. 30, 2015.

(56) References Cited

OTHER PUBLICATIONS

Official Communication for U.S. Appl. No. 14/451,221 dated Apr. 6, 2015.
Official Communication for U.S. Appl. No. 14/518,757 dated Dec. 1, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated Dec. 9, 2015.
Official Communication for U.S. Appl. No. 14/580,218 dated Jun. 26, 2015.
Official Communication for U.S. Appl. No. 14/581,920 dated Mar. 1, 2016.
Official Communication for U.S. Appl. No. 14/639,606 dated Oct. 16, 2015.
Official Communication for U.S. Appl. No. 14/639,606 dated Jul. 24, 2015.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/734,772 dated Jul. 24, 2015.
Official Communication for U.S. Appl. No. 14/746,671 dated Sep. 28, 2015.
Official Communication for U.S. Appl. No. 14/857,071 dated Mar. 2, 2016.
Restriction Requirement for U.S. Appl. No. 14/857,071 dated Dec. 11, 2015.

* cited by examiner

Kombucha geiser Life giving green and chia Shoots to the ceiling
Ellise Tan Company | Technical Writer etan@company.com
<mailto:email@company.com

```
<div class="document-text">
    <div class="document-plain-text" data-string-offset="0" allowselection="true">
        <span class="tag lexicon-hit data-multitag-ld="1"data-string-offset="0" allowselection="true">Kombucha</span>
        <span class="no-tags" data-string-offset="8">geiser Life </span>
        <span class="no-tags" data-string-offset="21">giving</span>
        <span class="no-tags" data-string-offset="27">green and chia</span>
        <span class="tag search-match" data-multitag-ld="2" data-string-offset="43">Shoots</span>
        <span class="no-tags" data-string-offset="49"> to the </span>
        <span class="no-tags" data-string-offset="57">ceiling</span>
        <span class="no-tags" data-string-offset="64">

Ellise Tan
Company | Technical Writer
</sapn>
<span class="tag strong-text" data-multitag-ld="3" data-string-offset="107" allowselection="true">etan@company.com</span>
<span class="no-tags" data-string-offset="124"> <mailto:</span>
<span class="tag strong-text" data-multitag-ld="4" data-string-offset="133">email@company.com/span>
<span class="no-tags" data-string-offset="151"> >
```

FIG. 5C

COMMUNICATION DATA PROCESSING ARCHITECTURE

PRIORITY AND INCORPORATION BY REFERENCE

This application claims the priority and benefit of U.S. Provisional No. 62/095,655, filed Dec. 22, 2014, which is hereby incorporated by reference herein in its entirety.

TECHNICAL FIELD

The present disclosure relates to systems and techniques for data integration and analysis.

BACKGROUND

Commercial entities, financial entities, law firms, government entities, and others, gather and process an enormous amount of information. Some of the information gathered and processed is in the form of electronic messages or other such communications. These communications are generated by employees, contractors, or clients and are sent to reviewers (for example, communications analysts, other employees, other contractors, other clients, and so forth) for review. Reviewers may review communications related to a group of employees to flag any possible malfeasance or illegal activity being conducted by an employee.

However, because of the enormous amount of information gathered and processed, it can be difficult for reviewers to readily review the communications. While some communications may include benign information (for example, standard introductory pleasantries or typical questions), other communications may include information that indicates that an employee is engaged in some illegal activity. Thus, communications that are misidentified or that are unidentified can have serious repercussions.

The following disclosure relates to systems and methods for efficiently and flexibly processing enormous amount of communications information and then presenting that information for review. The processing and presenting of information to the reviewer are also designed to minimize the chances that communications are misidentified or unidentified.

SUMMARY OF THE DISCLOSURE

The systems, methods, and devices described herein each have several aspects, no single one of which is solely responsible for its desirable attributes. Without limiting the scope of this disclosure, several non-limiting features will now be discussed briefly.

A communication data processing system is disclosed herein that allows reviewers to properly and timely review user communications. The communications may include emails, chat room communications, instant messages, text messages, and so forth. The communication data processing system may organize and process one or more communications so that certain parts of the message are highlighted or flagged allowing reviewers to readily easily flag relevant communications. For example, different types of highlighting can be applied to certain pre-selected words, email addresses external to the company, or other information that has been determined to be a possible flag for bad behavior. In one embodiment, the highlighting may be based on the particular user, or one or more persons, being reviewed. The one or more person's emails, chat room files, instant messages, and text can be complied for review, tied to an identifier that corresponds to the person(s), and assigned one or more group identifier(s) based upon the group(s) in which the person(s) is assigned. For example, if the one or more persons is a commodities trader employee in London, then the person may be assigned to the "commodities trading" group and to the "UK" group.

In one embodiment, a reviewer is presented with one or more person's electronic communications where certain portions of the communications have been highlighted or pre-flagged. In addition, the reviewer has the option of further updating the display, such as, for example, by adding additional words, removing known innocuous text from the message (such as disclaimers or signatures), updating the time zone of the message data, highlighting specific terms in the messages, and/or changing the category of pre-selected highlighted words (such as from "commodities" to "options"). The reviewer can then determine whether any of the communications should be flagged as possibly showing that the person(s) has been engaged in illegal or other prohibited activity.

In one embodiment, the communication data processing system works in conjunction with or provides data to a message reader system, such as the message reader systems disclosed in U.S. patent application Ser. No. 14/332,312 titled "Cable Reader Labeling" filed Jul. 15, 2014 and U.S. patent application Ser. No. 14/332,306 titled "Cable Reader Snippets and Postboard" filed Jul. 15, 2014, with are both hereby incorporated by reference herein in their entirety.

One aspect of the disclosure provides a computing system configured to display computer communication data. In this embodiment, the computing system comprises a network interface. The computing system further comprises a persistent memory and a computer processor. The computing system further comprises a computer readable storage medium storing program instructions configured for execution by the computer processor in order to cause the computing system to: access a plurality of communication data files; electronically decompress the plurality of communication data files and automatically convert the plurality of communication data files into a pre-determined standard format to create a plurality of formatted communication data files; process the plurality of formatted communication data files to generate a plurality of revised formatted communication data files by performing two or more of the following: removing duplicate data among the plurality of formatted communication data files; generating thread data for at least a subset of the plurality of formatted communication data files; generating and inserting lexicon tag data for at least a subset of the plurality of formatted communication data files; removing, from the plurality of formatted communication data files, data that meets pre-identified blacklisted criteria; or generating group association data for the plurality of formatted communication data files; and store the plurality of revised formatted communication data files in the persistent memory.

The computing system of the preceding paragraph can have any sub-combination of the following features: where generating and inserting lexicon tag data includes generating offset data related to offsets of text in an original data file; where the generated group association data indicates one or more groups associated with one or more persons who correspond to data files; where automatically converting the plurality of communication data files includes applying a first conversion process to email data in the plurality of communication data files and a second conversion process to a different type of communication data in the plurality of communication data files, the first conversion process different from the second conversion process; where automatically converting the plurality of communication data files includes applying a first conversion process to a first communication data in the plurality of communication data files, and a second conversion process to second communication data in the plurality of communication data files, the first communication data generated by a communications program from a first provider, the second communication data generated by a communications program from a second provider, and the first conversion process different from the second conversion process; where the one or more stored program instructions further cause the processor to access human resources data to correlate each of the plurality of communication data files to one or more persons; and where generating group association data further includes correlating each of the plurality of communication data files to one or more groups associated with one or more persons.

Another aspect of the disclosure provides a computer-implemented method of displaying a large amount communication data. In this embodiment, the computer-implemented method comprises, as implemented by one or more computer systems comprising computer hardware and memory, the one or more computer systems configured with specific executable instructions, accessing a plurality of communication data files; electronically decompressing the plurality of communication data files and automatically convert the plurality of communication data files into a pre-determined standard format to create a plurality of formatted communication data files; processing the plurality of formatted communication data files to generate a plurality of revised formatted communication data files by preforming two or more of the following: removing duplicate data among the plurality of formatted communication data files, generating thread data for at least a subset of the plurality of formatted communication data files, generating and inserting lexicon tag data for at least a subset of the plurality of formatted communication data files, removing from the plurality of formatted communication data files data that meets pre-identified blacklisted criteria, or generating group association data for the plurality of formatted communication data files; and storing the plurality of revised formatted communication data files in the persistent memory.

The computer-implemented method of the preceding paragraph can have any sub-combination of the following features: where generating and inserting lexicon tag data includes generating offset data related to offsets of text in an original data file; where the generated group association data indicates one or more groups associated with one or more persons who correspond to data files; where automatically converting the plurality of communication data files includes applying a first conversion process to email data in the plurality of communication data files and a second conversion process to a different type of communication data in the plurality of communication data files, the first conversion process different from the second conversion process; wherein automatically converting the plurality of communication data files includes applying a first conversion process to a first communication data in the plurality of communication data files, and a second conversion process to second communication data in the plurality of communication data files, the first communication data generated by a communications program from a first provider, the second communication data generated by a communications program from a second provider, and the first conversion process different from the second conversion process; where the instructions further include accessing human resources data to correlate each of the plurality of communication data files to one or more persons; where generating group association data further includes correlating each of the plurality of communication data files to one or more groups associated with one or more persons; and where the instructions further include sending the revised formatted communication data files for display in a communications reader system.

Another aspect of the disclosure provides non-transitory computer-readable medium comprising one or more program instructions recorded thereon, the instructions configured for execution by a computing system comprising one or more processors in order to cause the computing system to: access a plurality of communication data files; electronically decompress the plurality of communication data files and automatically convert the plurality of communication data files into a pre-determined standard format to create a plurality of formatted communication data files; process the plurality of formatted communication data files to generate a plurality of revised formatted communication data files by preforming two or more of the following: removing duplicate data among the plurality of formatted communication data files, generating thread data for at least a subset of the plurality of formatted communication data files, generating and inserting lexicon tag data for at least a subset of the plurality of formatted communication data files, removing, from the plurality of formatted communication data files, data that meets pre-identified blacklisted criteria, or generating group association data for the plurality of formatted communication data files; and store the plurality of revised formatted communication data files in the persistent memory.

The non-transitory computer-readable medium of the preceding paragraph can have any sub-combination of the following features: where generating and inserting lexicon tag data includes generating offset data related to offsets of text in an original data file; where the generated group association data indicates one or more groups associated with one or more persons who correspond to data files; where automatically converting the plurality of communication data files includes applying a first conversion process to email data in the plurality of communication data files and a second conversion process to a different type of communication data in the plurality of communication data files, the first conversion process different from the second conversion process; where automatically converting the plurality of communication data files includes applying a first conversion process to a first communication data in the plurality of communication data files, and a second conversion process to second communication data in the plurality of communication data files, the first communication data generated by a communications program from a first provider, the second communication data generated by a communications program from a second provider, and the first conversion process different from the second conversion process; where the instructions are further configured to access human resources data to correlate each of the plurality of communication data files to one or more persons; where generating group association data further includes correlating each of the plurality of communication data files to one or more groups associated with one or more persons; and where the instructions are further configured to send the revised formatted communication data files for display in a communications reader system.

BRIEF DESCRIPTION OF THE DRAWINGS

FIG. 5C illustrates one embodiment of a set of sample HTML code that includes example offset data.

DETAILED DESCRIPTION OF SPECIFIC EMBODIMENTS

Overview

Figure 1:
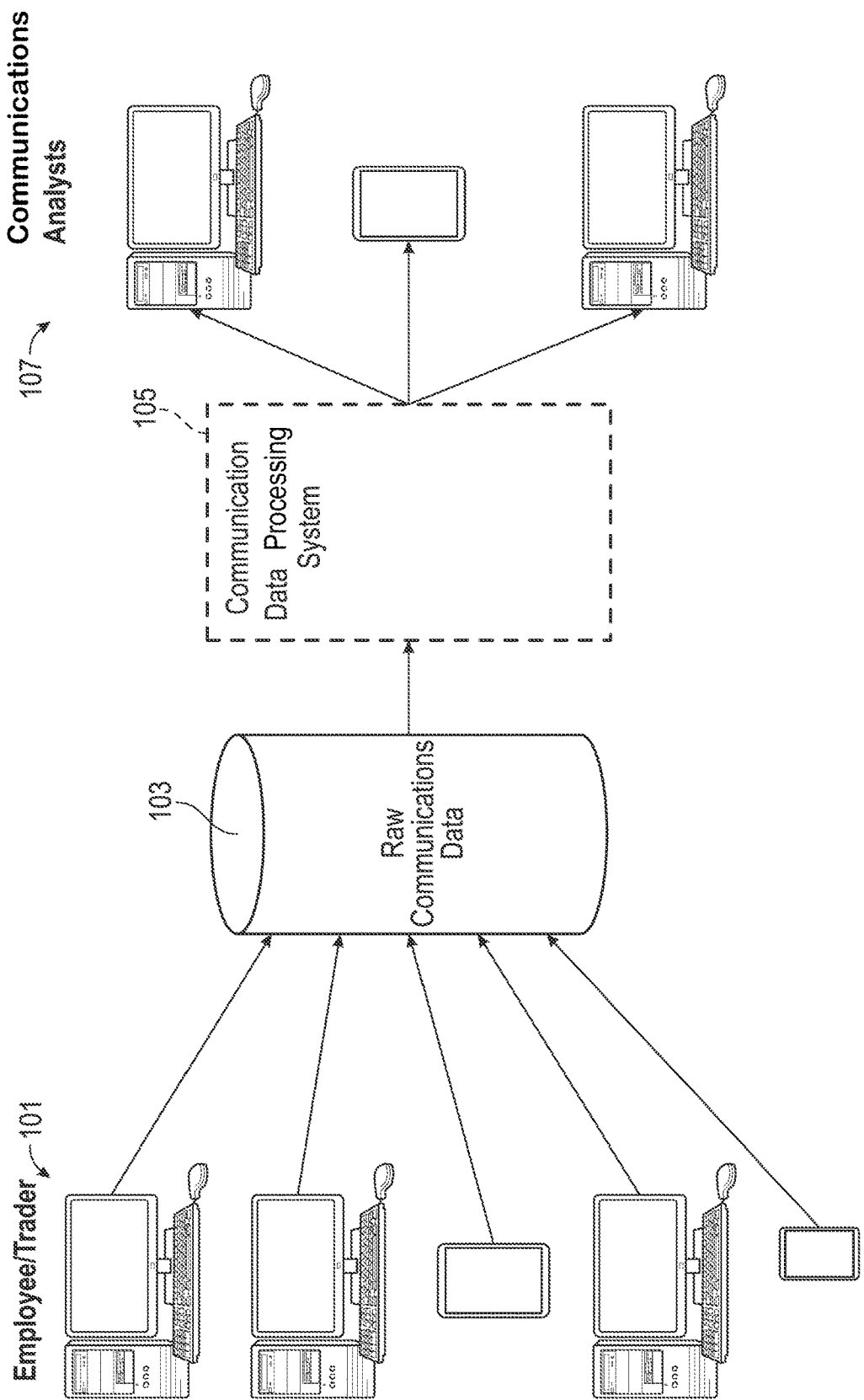
FIG. 1 illustrates a block diagram of a communication data processing system according to one embodiment.

FIG. 1 includes a broad overview of one embodiment where a communication data processing system is configured to quickly and efficiently process raw communication data from multiple devices used by a set of employees, such as, for example, a set of stock traders, and then present that communication data to a team of communications analysts for review.

FIG. 1 includes a set of employees that work for a company who have decision-making capacity with the potential to commit fraud, malfeasance, or illegal activity. For example, the employees can be comprised of equities traders capable of making illegal stock trades at a financial entity, such as an investment bank, hedge fund, mutual fund, and so forth. The employees 101 utilize electronic devices such as computers, tablets, and cell phones to generate, send and receive various electronic communications, such as, for example, email, text messages, and chat room messages. One skilled in the art would recognize that the employees 101 can use any electronic device to make electronic communications, including laptops, smart watches, automobile interface systems, and so forth. The figure is not a limiting disclosure as to what kind of electronic device the employees use to communicate.

As shown in the figure, the communications analysts 107 review the processed communication data on their devices in order to spot potential malfeasance or illegal activity. Communications analysts 107 may review the communications on any electronic device with a display, such as the computers depicted in FIG. 1. The communications analysts 107 may work for any company or government agency in an oversight capacity, and they may be tasked with either preventing the employees 101 from committing illegal activity before it occurs or catching employees 101 who have committed illegal activity. For example, the communications analysts 107 may be comprised of internal compliance analysts at a financial entity tasked with the job of ensuring that the organization and its employees 101 are operating within the relevant laws and regulations. The organization may then be able to utilize the system to confirm and verify that the organization is taking the requisite steps to monitor its traders and/or other employees. Alternatively, these communications analysts 107 could work for a government entity—for example, they could be regulators for the Securities Exchange Commission (SEC)—tasked with catching the wrongdoing of an organization and its employees 101 using communication data processing system 105.

Communication data from the devices used by employees 101 is collected and stored as raw communication data in a data store 103. In various embodiments, the raw communication data 103 can be stored in a single place or multiple places using a variety of data storage devices, methods, and structures. For example, raw communication data 103 can be stored in memory, on a hard drive, or on a cloud computing service.

After the communication data has been collected and stored as raw communication data 103, it is sent to or accessed by the communication data processing system 105. Communication data processing system 105 reads in the raw communication data 103, then processes the data based on the type of electronic communications included in the data as well as the needs of the monitoring organization and its communications analysts 107. The data is processed and presented in a readable format to reduce the number of communications that are misidentified or unidentified when they are reviewed by the communications analysts 107.

Communication Data Processing System

Figure 2:
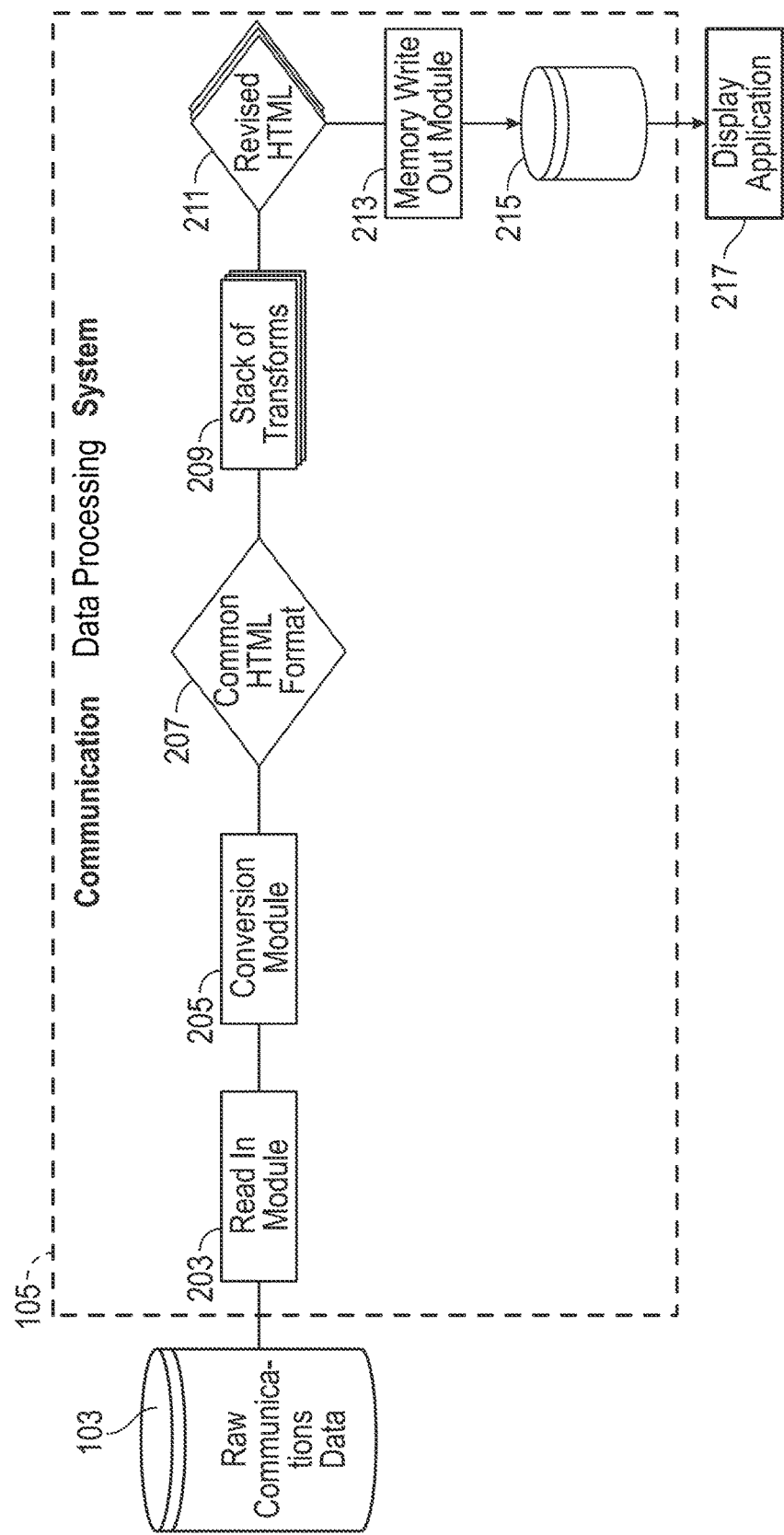
FIG. 2 illustrates another block diagram of a communication data processing system according to one embodiment.

FIG. 2 discloses an embodiment of the communication data processing system which illustrates how it interacts with and processes the raw communication data before writing out the revised communication data to memory for use by a display application. In the illustrated embodiment, communication data processing system 105 includes a Read In module 203, a Conversion module 205 configured to convert data into a common format, a Stack of Transforms 209, a Memory Write Out module 213, and data storage 215. It is recognized, however, the communication data processing system 105 as shown in FIG. 2 is not limited to the exact modules in this specific embodiment. For example, in another embodiment, communication data processing system 105 could include storage for raw communication data 201 and/or Display Application 217 and/or one of the modules could be divided up into separate modules. Communication data processing system 105 may even include the devices used by the employees and/or the communications analysts to create and read electronic communications, such as, for example, employees 101 and communications analysts 107.

In one embodiment, the architecture of communication data processing system 105 is implemented on top of a Universal Data Pipeline (UDP), such as, for example, the one described in U.S. application Ser. No. 14/533,433, which is hereby incorporated by reference herein in its entirety. In such an embodiment, several features may be relevant for this specific application. For instance, provenance tracking allows for tracing the lineage and transforms of any piece of data, such as the transforms performed by the Stack of Transforms 209. This may be used for when evidence of the lineage and all transforms produced may need to be produced, especially when significant transforms are being explicitly applied to the data, such as by Stack of Transforms 209. UDP also allows the implementation of the architecture without requiring the use of a specific backend. For example, some companies may use an online file storage web storage service, like Amazon S3 to store the data. In other embodiments, a Java-based file system like the Hadoop Distributed File System (HDFS) can be used.

In one embodiment, the raw communication data 201 includes stored communication data received from the various devices and communications applications utilized by the employees. As mentioned earlier, raw communication data 201 can be stored in a single place or multiple places, and using a variety of data storage devices, methods, and structures. For example, raw communication data 201 can be stored in memory, on a hard drive, and/or on a cloud computing service. To deal with the potentially large number of messages and communications sent by employees, the aggregated raw communication data is also typically stored in a compressed format in order to save space. In this embodiment depicted, the raw communication data 201 is compressed and stored on a set of one or more server hard drives.

The raw communication data 201 is accessed by the Read In module 203. Read in module 203 is the part of communication data processing system 209 configured to first process the raw communication data 201 and runs processes on the data to streamline the data for the rest of the system to utilize more effectively. For example, the Read In module 203 can decompress the raw communication data. If the communication data includes data from various devices and data sources, the Read In module 203 can separate out and sort the messages, emails, and chat logs that may comprise the communication data. The Read In module 203 may separate out and sort the communications based on what kind of communications they are and/or the specific application used to generate the communications. For example, the Read In module 203 may divide or categorize the data for Employee A into a group of Microsoft Outlook Email messages, a group of Bloomberg Chat messages, a group of Yahoo Instant Message messages, and a group of iPhone chat messages. The Read In module 203 may also extract the metadata from the individual content, then package the metadata with the individual content in the communication data. After the Read In module 203 performs its preliminary processing of the communication data, it can then send processed data to the Conversion module 205 to convert the data into a predetermined, common format.

The Conversion module 205 accesses the processed data, which in some embodiments, will be the metadata and the individual content of the communications packaged together. The Conversion module 205 then converts the data into a more uniform or common format. One skilled in the art will recognize that there are many benefits for doing so at this stage in the system. For example, chat logs may be in various formats and structures since they are produced by various chat programs, such as Lync, Bloomberg, and so forth. By converting these communications, along with other types of communications like emails and messages, into a more homogeneous and unified format, it will allow for the rest of the system to efficiently and indiscriminately process all of the communication data together, regardless of the original differences between each piece of raw communication data, and the various proprietary systems that generate the data. The Conversion module 205 may separate out and sort the communications based on the type of communications, and/or the specific application used to generate the communications. The Conversion module 205 may run communications-specific or application-specific processes designed to convert each piece of communications into a homogeneous format. Thus, if an employee uses a new communications application, a new process may be generated to the Conversion module 205 to convert data generated by that new communications application to the pre-selected format.

In one embodiment, the Conversion module 205 converts the data into a common Hypertext Markup Language (HTML) format 207. However, one skilled in the art will recognize that the common format need not be HTML. The converted data format can be any format, including XML, XHTML, Palantir XML (pXML), PalantirDocXML (DocXML), JavaScript Object Notation (JSON), Resource Description Framework (RDF), Comma Separated Files (CSV), text, plaint text, as well as other public and proprietary formats. In addition, in some embodiments, more than one format may be selected. For example, the Conversion module 205 may be configured to convert emails into HTML format and to convert chat room messages into XML. In the embodiment depicted by FIG. 2, the common HTML converted data is then made available to the Stack of Transforms 209.

In one embodiment, the Stack of Transforms 209 comprise various processes for detecting, processing, and/or transforming the communication data to make the communication data more readable and manipulable by the communications analysts and to reduce the risk that the communications are misidentified or unidentified. For example, the Stack of Transforms 209 can include a process for thread calculations, which will link email communications in the same email thread making it easier for the communications analyst to read. Rather than reading multiple communications including mostly the same content, the communications analyst will then be able to just read the email thread that includes all the content in the emails of the subset. Other processes in the Stack of Transforms 209 can include a de-duplication process, which can be used to remove duplicate email communications or perform the union of chat logs to remove redundant chat room data. The Stack of Transforms 209 could also include a blacklisting process designed to remove emails from a stored blacklist of email addresses. For example, any emails from 1-800-Flowers, or known spam emails, can be deleted. The Stack of Transforms 209 may also include a process for keyword searching or lexicon calculation, which then highlights in the communications any characters or words included in a pre-set collection of search terms. The lexicons could be assigned to one or more categories such as "money laundering," "anti-trust," "insider trading," "price manipulation," and so forth. The Stack of Transforms 209 may also include a process for group calculations to assign the communications to one or more review groups. For example, a communications analyst might be tasked with oversight of the communications of ten employees of a group on a certain day. The group calculations process could allow the communication data to be broken up and sorted, so that the communications of those ten employees could be presented to that communications analyst. The next day, a different communications analyst may be tasked with reviewing the communications of that same group. Human resources data may be utilized to assist in determining which group(s) an employee's communications should be assigned. In some embodiments, the communication data may also be assigned to an identifier that corresponds to a particular employee, such that the employee's emails, chat messages, and instant messages all refer to the same identifier.

One skilled in the art will recognize that the Stack of Transforms 209 could have alternatively been performed in a pipeline manner such that each process is carried out completely before the other completes. However, doing so would be inefficient and require a significant amount of input/output time. For example, for email communications the alternative pipeline way would require the system to first perform thread calculations on the emails, write those email threads back out to disk, read the data back in, de-dupe the emails, write the data back out, read the data back in, then pass only those emails that pass blacklist filtering. In comparison, this system efficiently processes communications of all types by stacking these processes together and performing at least two of them in parallel. In one embodiment, each communication is read in only once and the revised data is written to disk only once. Converting the different communications formats into a common format allows for the set of transforms to be stacked together and executed once for all different communications formats. Then the data is written back out to the communications analyst for review.

In the embodiment of FIG. 2, the stack of transforms 209 converts the data into revised HTML 211. However, one skilled in the art will recognize that the format need not be HTML. The data format for the revised data can be any markup language, including XML, XHTML, PalantirXML (pXML), PalantirDocXML (DocXML), or any other format. One benefit of using a markup language is for improved readability for when the communications analysts review the communications later on using the Display Application 217, as opposed to plain text. In the embodiment in FIG. 2, the revised HTML files are then passed to memory write out module 213.

The memory write out module 213 accesses the revised communication data and writes it to data storage 215. After the revised communication data is in data storage 215, it can be accessed by Display Application 217. Data storage 215 may include any electronic data storage device, including, for example, a persistent memory, a hard drive, a cloud computing server, and so forth. It may or may not be the same data storage device used to store raw communication data 201. The communications analysts are then able to access the revised communication data stored in data storage 215 as needed to conduct their review. The communications analysts may be able to perform client-side transformations to further improve the chances of spotting illegal activity, without overwriting or destroying the originally processed communication data, such as, for example, additional highlighting, changing of the flagged lexicons, changing of the time zone data, removal of known innocuous data, and so forth.

In one embodiment, Display Application 217 is a software application that may run on a variety of electronic devices and can be used by the communications analysts to review the employees' electronic communications. The electronic device running Display Application 217 may include a computer, tablet, smart phone, and so forth. In other embodiments, the Display Application 217 is a server side application such that only a shell application, such as a browser, is needed on the electronic device along with some input and output components to conduct the review. The Display Application 217 is configured to display the revised, processed communication data stored in data storage 215. In one embodiment, the Display Application 217 accesses the stored markup language files and displays the formatted and stylized communications in the display for the communications analyst to read. In some embodiments, Display Application 217 shows the content of the communications, as well as some or all of the corresponding metadata and properties of the communications. Display application 217 may include tools that allow the communications analyst to easily sift through all the communication data, such as by presenting a list view of all the communications that the communications analyst is in charge of reviewing. Display application 217 may also include tools for the communications analyst to search through all of the communication data using various criteria, and then Display Application 217 may display those search results to narrow down the communications that communications analyst has to review.

In various embodiments, the Display Application 217 is configured to allow the communications analyst to input or select further client-side transformations and refinements to be performed on the communication data. For example, there may be menus, fields, buttons, checkboxes, user interface elements, and so forth, which allow the communications analyst to highlight further search terms, alter the display of timestamps and disclaimers, and so forth. These interface tools may allow the communications analyst to perform tailored or idiosyncratic processes on the communication data, of a specific scope which fits the communications analyst's needs and requirements. These tools also allow for increased flexibility and efficiency when performed client-side rather than in the pre-processing stage with the Stack of Transforms 209.

Example Communication Data Processing System

Figure 3:
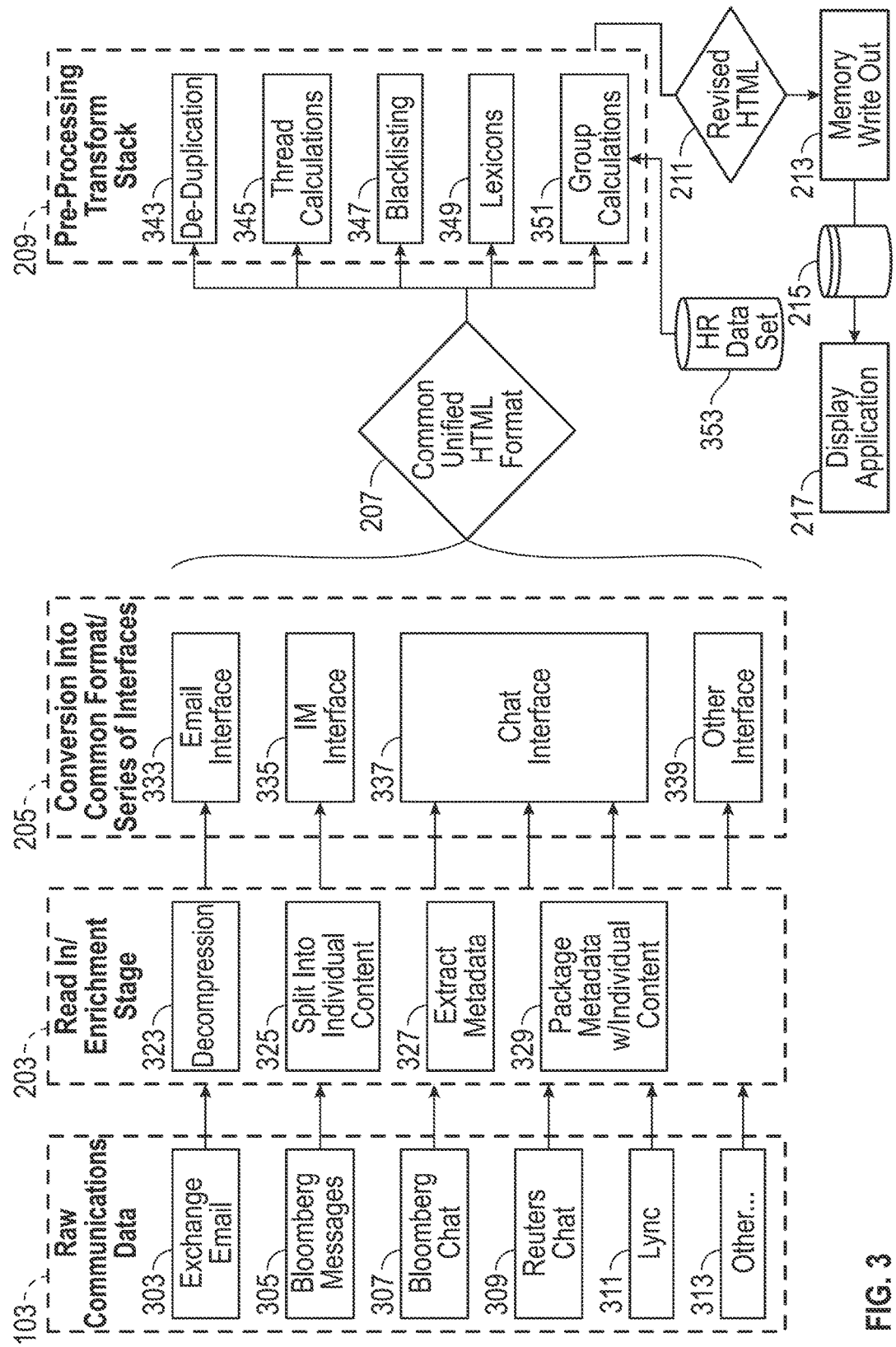
FIG. 3 illustrates an additional block diagram of a communication data processing system according to one embodiment.

FIG. 3 illustrates one embodiment of the communication data processing system showing how it processes various types of raw communication data 103 for later use by the display application 217.

In this embodiment, the example raw communication data 103 includes data generated from communications made through Microsoft® Exchange Email 303, Bloomberg® Messages 305, Bloomberg® Chat 307, Reuters® Chat 309, Microsoft® Lync 311, and any other communications platform, labeled as Other 313. A group of raw communication data 103 is made available to Read In module, sometimes referred to as the Enrichment Stage module, 321.

In the Read In Module 321, the communication data from the various communications platforms are first decompressed by Decompression module 323. Each file may include multiple communications in plain text, which makes it more difficult for the communications analyst to review later on. Emails or messages may also include various attachments or graphics, and so forth. Because communication data may be packaged as a group, the data may need to be split into individual content or communications, which is performed by Split Into Individual Content module 325. Module 325 may also parse the substantive content included within each piece of communication. The Extract Metadata 327 module is configured to extract the metadata from each piece of communication. This metadata may be used later on in various processes, such as for thread calculations and determining which emails belong to the same chain. It may also be used to help generate the markup language. However, metadata can become irrelevant if it no longer corresponds to the individual content from the originating piece of communication. Thus, the Package Metadata with Individual Content module 329 is configured to ensure that metadata is attached to or corresponds with the appropriate individual content. This packaged information can then be made available to the Conversion module 205. Data may be made available via a push or pull process.

The Conversion module 205 is configured to convert the communication data into a common format or structure. As noted above, making the communication data, which may come from various platforms and have varying structures or formats, look as similar or homogeneous as possible can be more efficient in certain embodiments. Such homogeneity allows for later processes to be performed once, and performed indiscriminately, on all of the communication data regardless of their originating platform, structure, or format. It also may reduce the number of times that the data would have to be read in from or out to disk. In some embodiments, this conversion may be performed using a series of interfaces. For example, Email Interface 333 may sort out all the emails, such as those in Exchange Email 303, and perform email-specific conversions. The Email Interface 333 may include different conversions for the different types of email data. Thread calculations may be performed at this stage, or in some embodiments, they may be performed later on for efficiency reasons. IM Interface 335 may sort out all the instant messages, such as those in Bloomberg Messages 305, and perform IM-specific conversions. Chat Interface 337 may sort out all the chat logs, such as those in Bloomberg Chat 307, Reuters Chat 309, and Lync 311, and perform chat-specific conversions. The Chat Interface 337 may include different conversions for the different types of communication data generated by communications applications from different providers. In addition, chat unions may be performed at this stage, or in some embodiments, they may be performed later on for efficiency reasons. Other Interface 339 may sort out the other types of communications, such as those in Other 313, and perform specific conversions. The goal of these interfaces is to convert the data into a common, unified format. As discussed earlier, this format may consist of any markup language, such as HTML, XML, XHTML, PalantirXML (pXML), PalantirDocXML (DocXML), and so forth. In the embodiment of FIG. 3, the data is converted into a common HTML format and passed to Transform Stack 209.

Transform Stack 209 is configured to process the communication data for detection and transformation. In this embodiment, the transform stack 209 includes de-duplication 343, thread calculations 345, blacklisting 347, lexicons 349, and/or group calculations 351 in parallel.

De-duplication 343 removes duplicate communications or portions of communications where the same content is included within another communication. For example, a message or email from user A to user B will create two identical pieces of communications: one that resided with the sender and the one obtained by the recipient. Duplicates can be deleted. De-duplication may also be configured to perform the union of chat logs. For example, on a given day, user A may be present in a chat room from 8 am to 4 pm. User B may have been present in the same chat room from 10 am to 6 pm. Chat logs of the room which include both user A and user B can be merged to create a singular, comprehensive chat log from 8 am to 6 pm and removing the duplicate log data from 10 am to 4 pm. De-duplication 343 allows for a reduction in the amount of communication data that communications analysts have to review, reducing the chances of the communications analyst overlooking any important evidence or risky behavior.

Thread calculations 345 determine which emails belong in a single email thread, so that only the email including the entire thread needs to be reviewed by the communications analyst. One method for doing this is to match significant portions of content included within emails. However, in other embodiments, the thread calculations are performed using a union-find algorithm, which utilizes the metadata, such as, for example, metadata obtained from module 327, to link emails of a given thread.

Blacklisting 347 allows for the removal of communications sent from, or received by, parties, addresses, or devices that do not require review and are known to be innocuous. For example, blacklisting 347 may be configured to delete all emails that were sent or received by emails associated with 1-800-FLOWERS. By deleting irrelevant communications, the amount of communications that the communications analysts have to review can be reduced.

Lexicons 349 allows for pre-determined keyword searching and highlighting. The system may have pre-set lexicons, or search term lists, associated with various illegal acts, regulations, and so forth, which may be relevant to the communications analyst. For example, there may be pre-set lexicons for instances of "insider trading", "anti-trust", or "dodd-frank", and so forth. In some embodiments, one or more of the categories of pre-set lexicons is designated as the default for a particular communication, employee or group. For example, a communications analyst like a SEC regulator may have to review communications for possible insider trading, so the "insider trading" pre-set lexicon may be activated. The "insider trading" lexicon may include search terms related to the possible occurrence of illegal insider trading, such as terms like "hot tip", and so forth. Multiple lexicons may be applied at once. In addition, the application of lexicons at this stage allows for statistics to be generated for the various lexicon sets, so that it can be determined which lexicons are generating the most search term hits. That information can be used to further refine the lexicon terms or make future decisions on what lexicons may be relevant in a given situation. For example, if a term in a lexicon category ends up being in 80% of all communications, it is likely a term that should not be used.

After a search term in a lexicon is found in the communication data, that instance of the term may be marked for future highlighting. The highlighting may be marked by the insertion of a tag in HTML, XML, or any other markup language, that notifies the system that the discovered terms should be highlighted. The tag may also include information about the lexicon category(ies) so that the term is only highlighted when the corresponding category(ies) is selected.

The tag may also include an offset of the term in the original data, so that the highlighting of the discovered term may be preserved if characters are added to, or deleted from, the communication data. The offset may also allow the system to preserve the originally un-highlighted communication data, which may be useful, such as in instances where the set of lexicons being applied is changed. This tagging of offsets may also occur client-side at a later stage in the display application 217. The offset inserted in the tag may be calculated, stored, or implemented through a variety of methods. In one method, the offset for a highlighted search term or string may be a character offset comprising an integer of zero or greater. For example, a character offset value of ten may signal that the highlighted term should be displayed starting from ten characters after where it was originally displayed in the original communication data.

Group calculations 351 are configured to allow the communication data to be sorted out or organized into groups. A group may be a set of employees that a single communications analyst is assigned review, or the groups may be selected based on any other criteria. For example, the group can be based on a logical or intuitive group—for instance, all of the employees in a particular role at a company or entity. For example, a communications analyst might be tasked with oversight of the communications of ten employees of a group on a certain day (for example, the ten traders in the commodities trading group). The group calculations 351 may also be configured to allow the communication data to be broken up and sorted, so that the communications of those ten employees could be presented to that communications analyst. To generate these groups, some embodiments of the system may utilize external data, such as data from the Human Resources (HR) department at a company or entity. The group data will help the system determine how the communications will be grouped. In this embodiment, HR data set 353 is accessed by the group calculations 351 module and used to sort or organize the communication data into groups.

After the processes in the transform stack 209 are conducted, the revised communication data, in the format of any markup language, such as HTML, XML, XHTML, PalantirXML (pXML), PalantirDocXML (DocXML), and so forth, is then passed to the memory write out 213 module. Memory Write Out module 213 module accesses the revised communication data and writes it to data storage 215. Again, data storage 215 may include any electronic data storage device or method and may be memory, a hard drive, a cloud computing server, and so forth. It may or may not be the same data storage device used to store raw communication data 103. Data storage 215 allows the communications analyst to access the processed communication data at his/her leisure and perform additional client-side transformations to further improve the chances of spotting illegal activity, without overwriting or destroying the originally processed communication data. Once the revised communication data is in data storage 215, it can be accessed by the communications analyst through display application 217. Display application 217 is discussed in more detail with respect to FIGS. 4, 5A, and 5B.

Display Application

Figure 4:
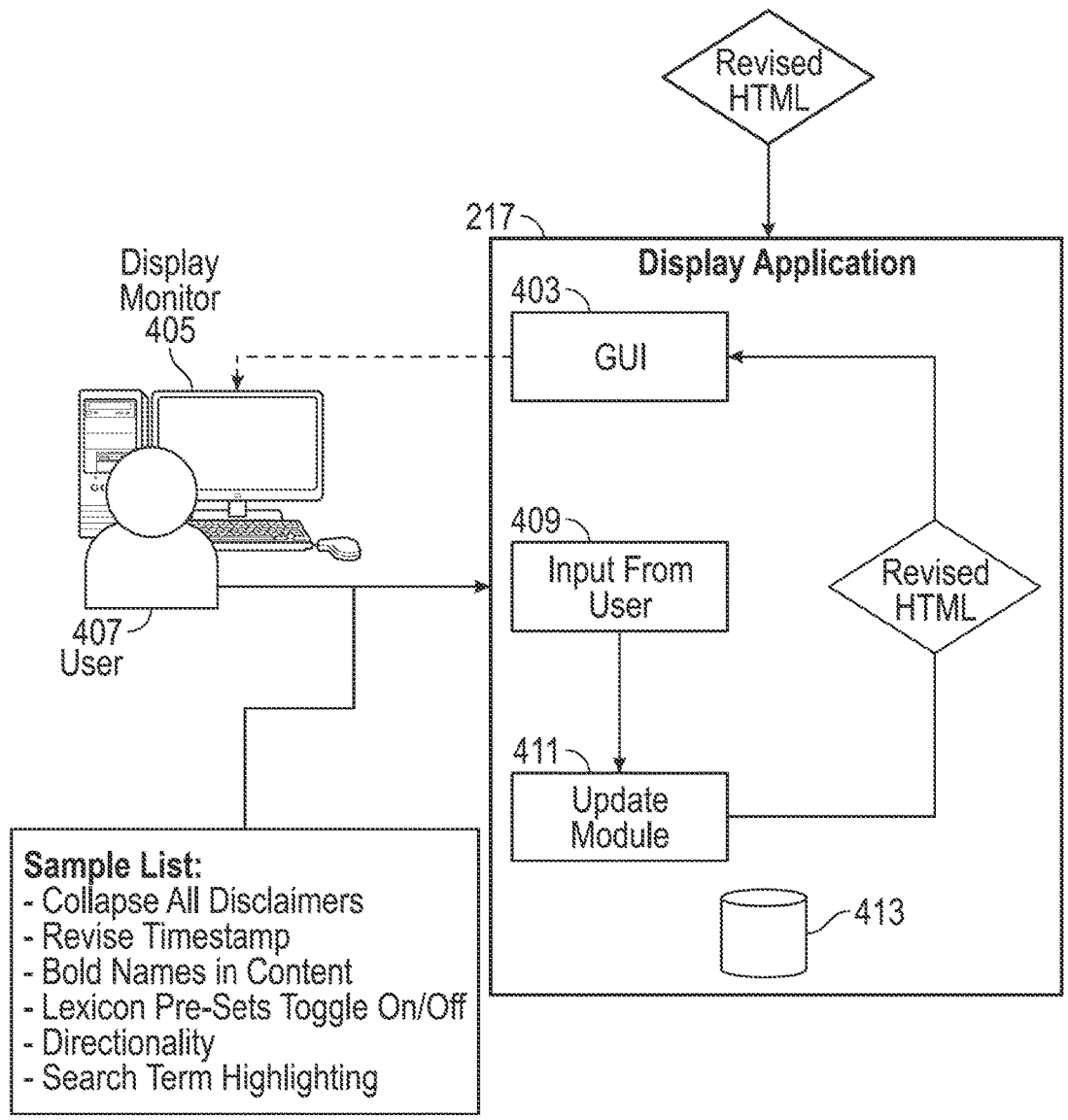
FIG. 4 illustrates a block diagram of a communications analyst system according to one embodiment.

FIG. 4 illustrates one embodiment of the display application 217 and its interaction with user 407, which is typically a communications analyst 107. The display application 217 is used to review the revised communication data, and may include a graphical user interface (GUI) 403, a module for receiving input from the user 409, an update module 411, and in some embodiments, data storage 413 that may be local and client-side.

Display application 217 is configured to receive the revised communication data from the data storage 413 and to present the data to the reviewer to allow him/her to view and/or manipulate the message data via the graphical user interface (GUI) 403. The display application 217 may include GUI logic which includes program instructions configured for execution by one or more computer processors of the communications analyst's or reviewer's device 107, which are operable to receive user input and to display a graphical representation of the messages using the approaches described herein. The GUI logic may be operable to receive user input from, and display a graphical representation of the messages to, a GUI that is provided on a display 405 by the computer system on which the communications analysts' device 107 executes.

In some embodiments, the GUI logic is omitted. For example, in one embodiment, the reviewer device 107 (and specifically the display application 217) may comprise an application program or process that issues one or more function calls or application programming interface (API) calls to the message data server (not shown) to obtain information resulting from, to provide input to, and to execute along with the message data server, the processes or one or more steps thereof as described herein. For example, the reviewer device 107 may request messages using a programmatic interface, and then the reviewer, using the reviewer device 107, may use, process, log, store, label, and/or otherwise interact with the messages according to local logic. The reviewer device 107 may also interact with the message data server to provide input, labeling instructions, and/or other data as described herein using a programmatic interface, and then the message data server may use, process, log, store, label, and/or otherwise interact with the messages according to the message data server logic.

The message data server may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. When executed by one or more processors of the computer system, logic in the message data server is operable to analyze and/or label the messages according to the techniques described herein. In one embodiment, the message data server may be implemented in a Java Virtual Machine (JVM) that is executing in a distributed or non-distributed computer system. In other embodiments, the message data server may be implemented as a combination of programming instructions written in any programming language (for example C++ or Visual Basic) and hardware components (for example, memory, CPU time) that have been allocated for executing the program instructions.

In this embodiment, the GUI 403 displays the messages or communications through display monitor 405 to user 407, who is typically a communications analyst. To better spot the occurrence of possible wrongdoing, user 407 may then provide inputs into the display application 217, which are received by module 409. Some of these user inputs may be directed towards ways of altering the information that is displayed on the display monitor 405, such as, for example, collapsing all disclaimers in the communications; inserting timestamps as machine representations of time or changing the time zone of the times in the communications; bolding names or email addresses in the content of the communications; toggling on/off any pre-set lexicons; identifying directionality and who the communications are coming from or going to; and/or highlighting of further search terms. In one embodiment, the revision made to the timestamp can be the result of inserting a representation of time in a tag so that the system understands that it is a representation of time and not just a string of characters.

After module 409 receives these inputs, it then directs update module 411 to make updates in the markup language. Update module 411 makes those changes, typically by inserting a HTML or XML tag so that the changes are reversible. The changes are then reflected in the GUI 403 for further review, and the cycle continues to assist the reviewer in spotting possible illegal activity.

A data storage 413 may be present in some embodiments in order to store the revised communication data as it exists at any stage conveyed by FIG. 4. Data storage 413 will typically be local and client-side, so that display application 217 can quickly and efficiently provide updates to the communication data for review, without having to disrupt the original communication data stored elsewhere or having to repeatedly acquire communication data for review. However, in other embodiments, the data storage 413 is not stored in the user's device, but is store remotely, for example, in a cloud server or in data store 215.

Display application 217 and GUI 403 will be discussed in more detail in FIGS. 5A and 5B.

Communications Analysts User Interface

Figure 5A:
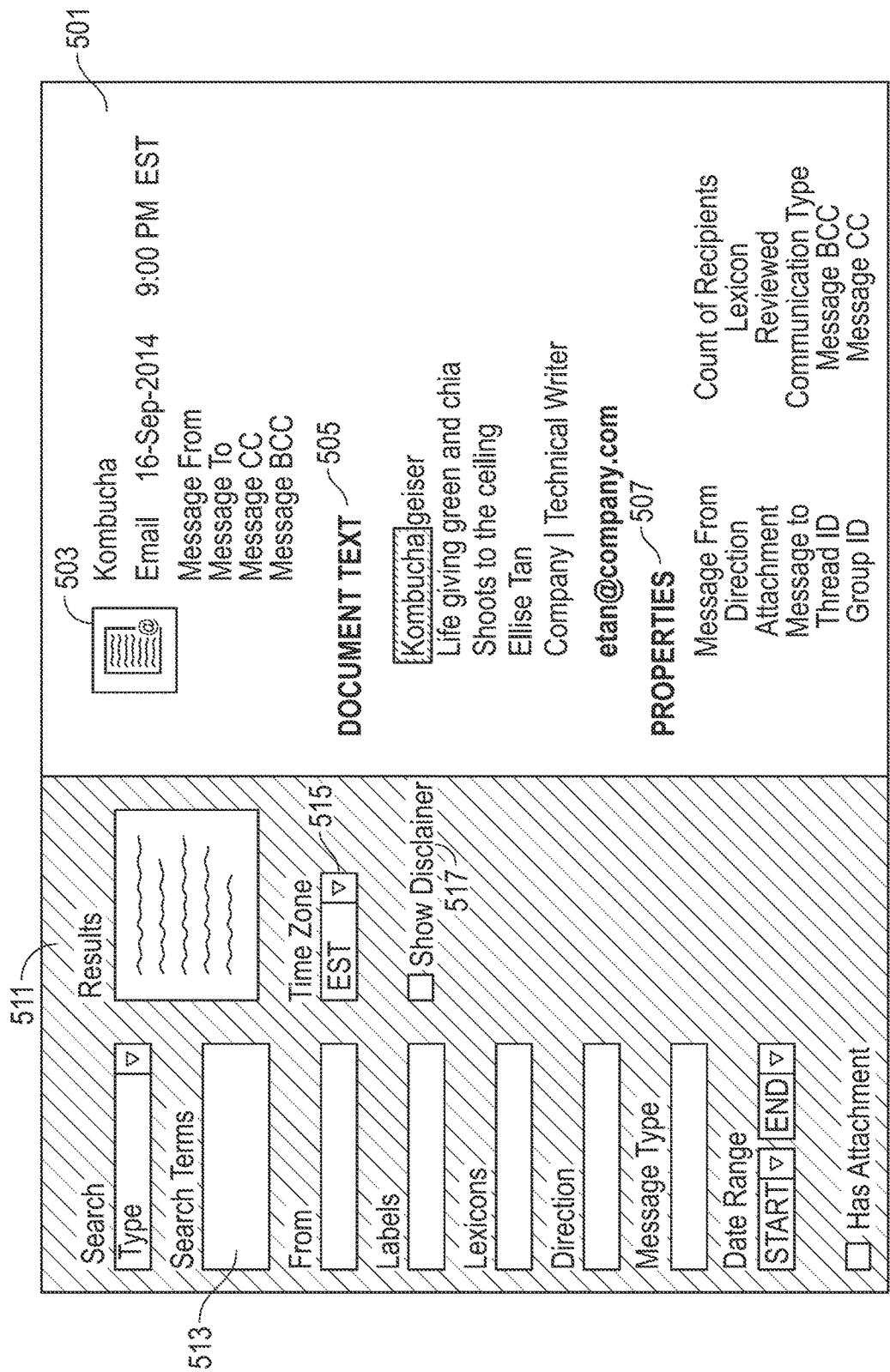
FIG. 5A illustrates one embodiment of an example user interface of the communication data processing system including a sample email message.
Figure 5B:
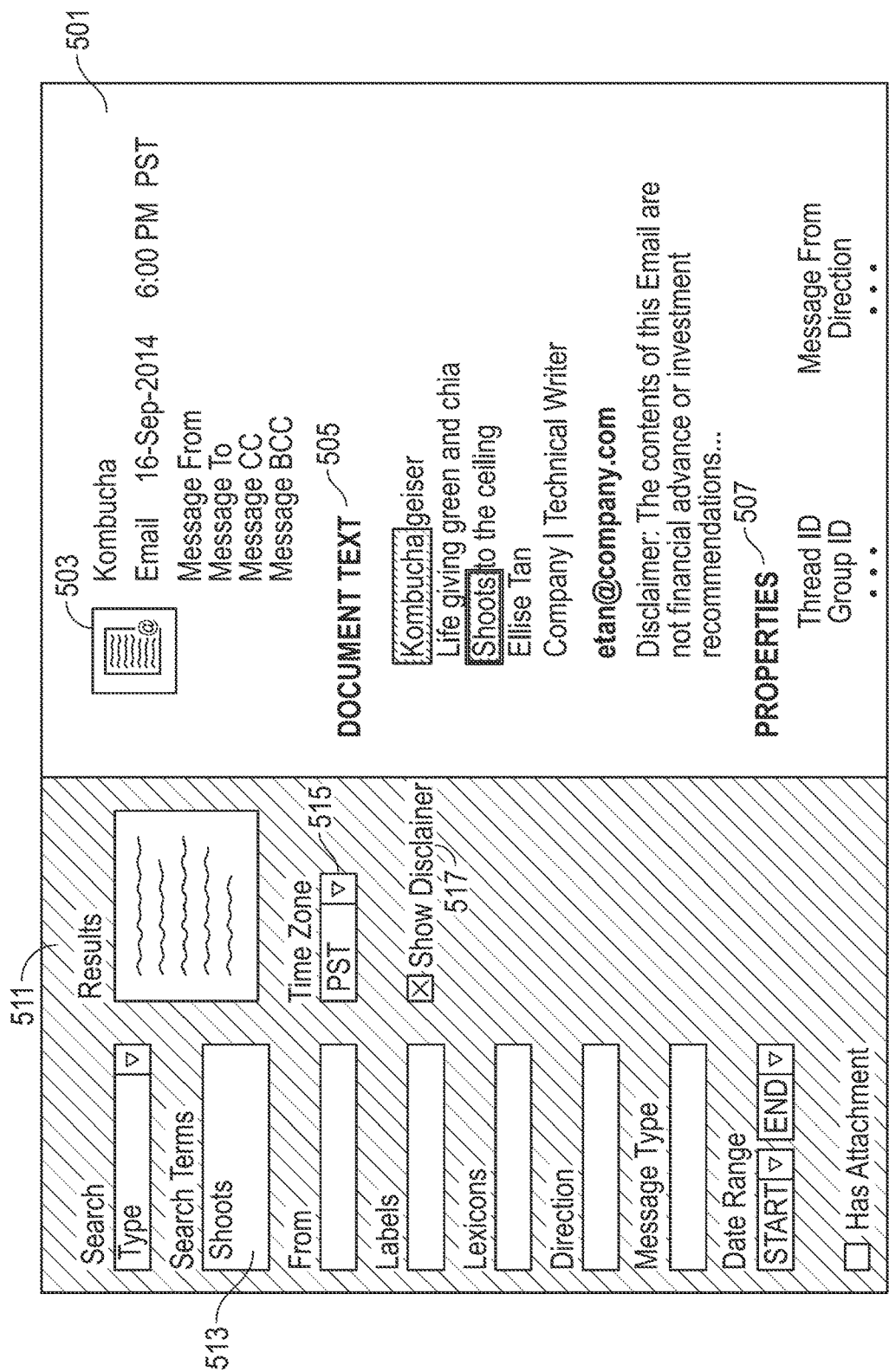
FIG. 5B illustrates one embodiment of an example user interface of the communication data processing system including a sample email message.

FIG. 5A and FIG. 5B illustrate an embodiment of the Display Application and the GUI. FIG. 5A includes an example display of one piece of communication data. Various user inputs are gathered to update the presentment of the communication data, and the updates are reflected in FIG. 5B. The various user inputs can also be seen in FIG. 5B.

In FIG. 5A, a portion of the content of each communications message (for example, a title, an excerpt of the body of the message, a document or message identification code, and so forth) is displayed in browser window 501. The communications message (or a portion thereof) may be displayed in any shape and in any format in the browser window 501. In this embodiment, the header of the email communications can be seen in section 503 of browser window 501. This section shows a graphic of the document type, the subject of the email, the senders and recipients, and so forth. The content of the document is displayed in document text section 505. In this embodiment, "Kombucha" was part of the lexicon pre-set and instances of it have been highlighted in the browser window 501. The email in the document text has also been presented in bold. Properties section 507 displays relevant properties of the communications document in browser window 501. This information was originally stored in plain text, but the processes in the system have now broken up the information and presented it in a stylized format that makes it easier for the communications analyst to read.

Input window 511 shows a list of various user inputs that can be performed. For example, the user can run searches to narrow down the field of presented communications documents, and the results will be summarily presented in input window 511. The user can then sift through the search results and those corresponding communications documents will be displayed in browser window 501. In this embodiment, input window 511 includes a field to input search terms 513. When a search term is entered into this field 513, the display application may highlight those search terms found in the communication data. This embodiment also includes a dropbox for the user to set a time zone 515, and a check-box to show disclaimers 517. When a user conveys those inputs in input window 511, those changes will be reflected in browser window 501. The input window 511 may also include an interface tool to select a different set of lexicon categories.

In FIG. 5B, these changes can be seen reflected in browser window 501. For example, "shoots" has now been entered into search terms field 513. As a result, "shoots" has been highlighted in the document text 505 portion of browser window 501. "Kombucha" remains highlighted because that was part of a pre-set lexicon search, which the user has not yet toggled off or changed. The user has changed drop box 515 so that the time zone is now "PST" instead of "EST", so now the email timestamp is reflected to be three hours earlier as the timestamp has changed from Eastern time to Pacific time. That change can be seen in the header section 503 of browser window 501. Finally, the show disclaimer check-box 517 has also been checked. As a result, in the document text section 505 of browser window 501, it can be seen that a disclaimer has been added to the text. That disclaimer is part of the original communication data, but in FIG. 5A, it had been omitted for display by the display application.

The embodiments shown are not meant to convey an exhaustive list of all the potential inputs or changes that can be made to the communication data. Typically these changes to the communication data will be performed in a manner that allows them to be undone, such as through the insertion or modification of a HTML or XML tag. For example, the addition of a search term in the search term field 513 may insert a tag in the data that signals the discovered term to be highlighted. The tag may also include an offset that allows that highlighting to be preserved on the discovered term regardless of any other changes to the data, such as the display/insertion of disclaimers. The tag and the offset may also serve to undo the highlighting, such as if a different search term is entered into field 513. In addition, the example displays are not meant to be limited as it is recognized that a variety of user interface tools may be used and may be arranged in different ways.

FIG. 5C shows one embodiments of a sample portion of communication data in a markup language such as HTML, XML, and so forth. As can be seen, preceding "Kombucha" is the tag:

<span class="tag lexicon-hit"
data-multitag-id="1"
data-string-offset="0"
allow selection="true">

This tag informs browser window 501 that "Kombucha" should be displayed as highlighted. Since the offset value is zero, that means "Kombucha" has not been offset at all from its original position in the communication data.

Preceding "Shoots" is the tag:
<span class="tag search-match"
data-multi-tag-id="2"
data-string-offset="43">

This tag informs the browser window 501 that "Shoots" should also be displayed as highlighted. In some embodiments, the highlighting may be a different color than the highlighting used on "Kombucha" to signal that the terms were found using different search processes and/or they may be assigned to different lexicon categories. This tag preceding "Shoots" also signals to the browser that the word "Shoots" has an offset of 43, which means that it occurred at character location 43 in the original communication. This allows the browser window 501 to display the updated communication data without losing information about the original data.

Similarly, preceding the email, etan@company.com, is the tag:
<span class="tag strong-text"
data-multitag-id="3"
data-string-offset="107"
allowselection="true">

This tag signals to browser window 501 to display the email in bold, and that the term has an offset of 107, which means it occurred at character location 107 in the original communication.

Example Process Flows

Figures 6, 7:
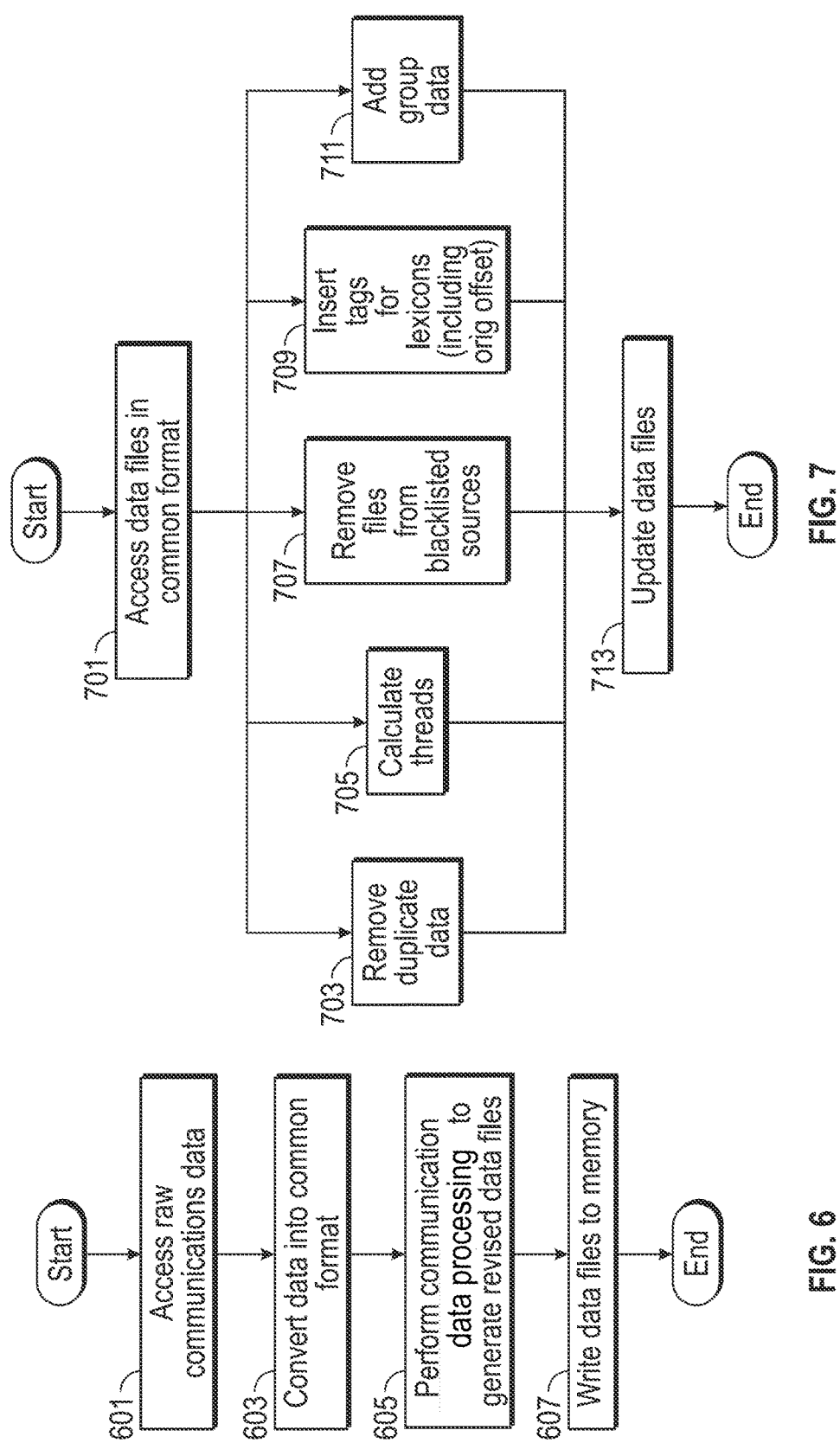
FIG. 6 is a flowchart depicting one embodiment of a method of operation of the communication data processing system.
FIG. 7 is a flowchart depicting one embodiment of another method of operation of the communication data processing system.

FIG. 6 illustrates a flowchart depicting one embodiment of illustrative operations of the communication data processing system. Depending on the embodiment, the method of FIG. 6 may be performed by various computing devices, such as by the message data server, a different server, a system of servers, a cloud computing service, and so forth. Depending on the embodiment, the method of FIG. 6 may include fewer and/or additional blocks and the blocks may be performed in an order different than illustrated.

In FIG. 6, the system accesses raw communication data in block 601. Then the system converts the data into a common format in block 603. In some embodiments the system stores information about which common format to use. Different clients, process, or data may use different common formats. The system then performs communication data processing to generate revised data files in module 605. After, the system writes the revised data files to memory in block 607.

FIG. 7 is a flowchart depicting one embodiment of illustrative additional operations of the communication data processing system. Depending on the embodiment, the method of FIG. 7 may be performed by various computing device, such as by the message data server, a server, a system of servers, a cloud computing service, and so forth. Depending on the embodiment, the method of FIG. 7 may include fewer and/or additional blocks and the blocks may be performed in an order different than illustrated.

In FIG. 7, the system first accesses data files in common format in block 701. In some embodiments the system stores information about which common format to use. Different clients, process, or data may use different common formats. The data files passed, in common format, are accessed by a variety of modules, which may run in parallel. These modules may include: the remove duplicate data block 703, the calculate threads block 705, the remove files from blacklisted sources block 707, the insert tags for lexicons block 709, and the add group data block 711. These modules may process the data in parallel along the lines discussed herein and update them in the update data files block 713. These updated data files may then be reviewed, further processed, and so forth.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

Figure 8:
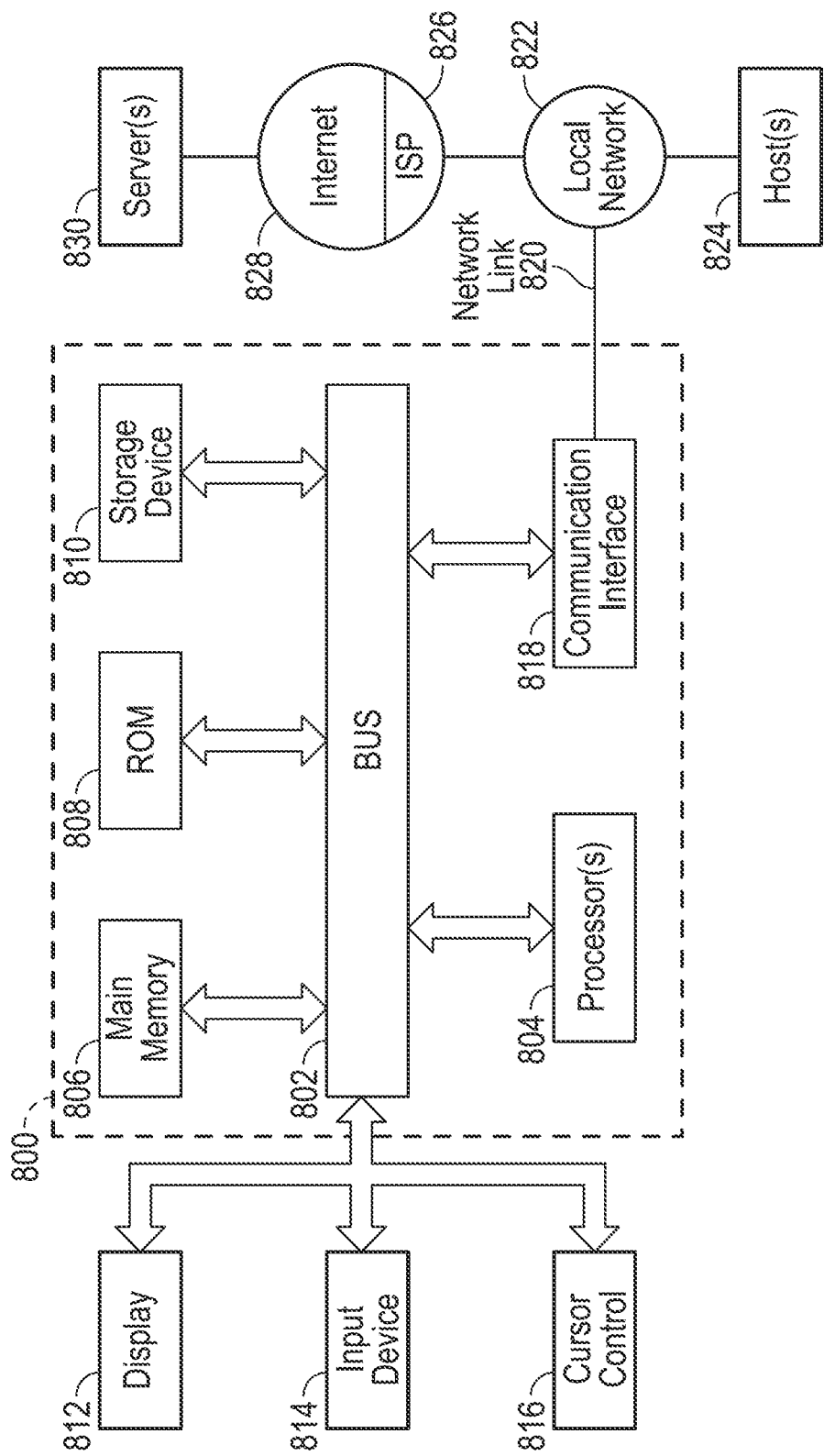
FIG. 8 illustrates one embodiment of a computer system with which certain methods discussed herein may be implemented.

For example, FIG. 8 is a block diagram that illustrates a computer system 800 upon which an embodiment may be implemented. For example, any of the computing devices discussed herein, such as the reviewer device 107, the data storage 103, the communication data processing system, and/or the companies, the employees, or their devices 101 (which may be government entities in some embodiments), may include some or all of the components and/or functionality of the computer system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), and so forth, is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions included in main memory 806. Such instructions may be read into main memory 806 from another storage medium, such as storage device 810. Execution of the sequences of instructions included in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieve and execute the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Object Centric Data Model

To provide a framework for the above discussion of the specific systems and methods described herein, an example database system using an ontology will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by an ontology. The conceptual data model is independent of any particular database used for durably storing one or more database(s) based on the ontology. For example, each object of the conceptual data model may correspond to one or more rows in a relational database or an entry in Lightweight Directory Access Protocol (LDAP) database, or any combination of one or more databases.

An ontology, as noted above, may include stored information providing a data model for storage of data in a database. The ontology may be defined by one or more object types, which may each be associated with one or more property types. At the highest level of abstraction, data object is a container for information representing things in the world. For example, data object can represent an entity such as a person, a place, an organization, or other noun. Data object can represent an event that happens at a point in time or for a duration. Data object can represent a document or other unstructured data source such as an email message, a news report, or a written paper or article. Each data object is associated with a unique identifier that uniquely identifies the data object within the database system.

Different types of data objects may have different property types. For example, a "Person" data object might have an "Eye Color" property type and an "Event" data object might have a "Date" property type. Each property as represented by data in the database system may have a property type defined by the ontology used by the database.

Objects may be instantiated in the database in accordance with the corresponding object definition for the particular object in the ontology.

The data objects defined in the ontology may support property multiplicity. In particular, a data object may be allowed to have more than one property of the same property type. For example, a "Person" data object might have multiple "Address" properties or multiple "Name" properties.

Each link represents a connection between two data objects. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely include similar, if not identical property values. In one embodiment, a link between two data objects may be established based on similar or matching properties (for example, property types and/or property values) of the data objects. These are just some examples of the types of connections that may be represented by a link and other types of connections may be represented; embodiments are not limited to any particular types of connections between data objects. For example, a document might include references to two different objects. For example, a document may include a reference to a payment (one object), and a person (a second object). A link between these two objects may represent a connection between these two entities through their co-occurrence within the same document.

Each data object can have multiple links with another data object to form a link set. For example, two "Person" data objects representing a husband and a wife could be linked through a "Spouse Of" relationship, a matching "Address" property, and one or more matching "Event" properties (for example, a wedding). Each link as represented by data in a database may have a link type defined by the database ontology used by the database.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to display computer communication data, the computing system comprising:
    a network interface;
    a non-transitory memory;
    a computer processor; and
    a computer readable storage medium storing program instructions configured for execution by the computer processor in order to cause the computing system to:
        access a plurality of communication data files in a plurality of different formats;
        electronically decompress the plurality of communication data files;
        convert the plurality of communication data files into a pre-determined, browser-renderable standard format to create a plurality of formatted communication data files;
        generate lexicon tag data indicating a change in position from an original position of text in an original data file of the plurality of communication data files, the change in position being caused at least in part by the conversion of the plurality of communication data files into the pre-determined, browser-renderable standard format;
        insert the lexicon tag data into a subset of the plurality of formatted communication data files that are in the pre-determined, browser-renderable standard format;
        process the plurality of formatted communication data files to generate a plurality of revised formatted communication data files by performing two or more of the following:
            removing duplicate data among the plurality of formatted communication data files;
            generating thread data for at least the subset of the plurality of formatted communication data files;
            removing, from the plurality of formatted communication data files, data that meets pre-identified blacklisted criteria; or
            generating group association data for the plurality of formatted communication data files;
        store the plurality of revised formatted communication data files in the non-transitory memory; and
        transmit the revised formatted communication data files, including the lexicon tag data, for rendering in a browser.

2. The computing system of claim 1, wherein the two or more includes generating the group association data, and the generated group association data indicates one or more groups associated with one or more persons who correspond to data files.

3. The computing system of claim 1, wherein converting the plurality of communication data files includes applying a first conversion process to email data in the plurality of communication data files and a second conversion process to a different type of communication data in the plurality of communication data files, the first conversion process different from the second conversion process.

4. The computing system of claim 1, wherein converting the plurality of communication data files includes applying a first conversion process to a first communication data in the plurality of communication data files, and a second conversion process to second communication data in the plurality of communication data files, the first communication data generated by a first communications program from a first provider, the second communication data generated by a second communications program from a second provider, and first conversion process different from the second conversion process.

5. The computing system of claim 1, wherein the one or more stored program instructions further cause the processor to access human resources data to correlate each of the plurality of communication data files to one or more persons.

6. The computing system of claim 5, wherein the two or more includes generating the group association data, and generating the group association data further includes correlating each of the plurality of communication data files to one or more groups associated with one or more persons.

7. A computer-implemented method of displaying a large amount of communication data, the computer-implemented method comprising:
    as implemented by one or more computer systems comprising computer hardware and memory, the one or more computer systems configured with specific executable instructions,
    accessing a plurality of communication data files that are in a plurality of different formats;
    electronically decompressing the plurality of communication data files;
    converting the plurality of communication data files into a pre-determined, browser-renderable standard format to create a plurality of formatted communication data files;
    generating lexicon tag data indicating a change in position from an original position of text in an original data file of the plurality of communication data files, the change in the position being caused at least in part by the conversion of the plurality of communication data files into the pre-determined, browser-renderable standard format;
    inserting the lexicon tag data into a subset of the plurality of formatted communication data files that are in the pre-determined, browser-renderable standard format;
    processing the plurality of formatted communication data files to generate a plurality of revised formatted communication data files by performing two or more of the following:
        removing duplicate data among the plurality of formatted communication data files;
        generating thread data for at least the subset of the plurality of formatted communication data files;
        removing, from the plurality of formatted communication data files, data that meets pre-identified blacklisted criteria; or
        generating group association data for the plurality of formatted communication data files;
    storing the plurality of revised formatted communication data files in a non-transitory memory; and
    transmitting at least the lexicon tag data for rendering in a browser.

8. The computer-implemented method of claim 7, wherein the two or more includes generating the group association data, and the generated group association data indicates one or more groups associated with one or more persons who correspond to data files.

9. The computer-implemented method of claim 7, wherein converting the plurality of communication data files includes applying a first conversion process to email data in the plurality of communication data files and a second conversion process to a different type of communication data in the plurality of communication data files, the first conversion process different from the second conversion process.

10. The computer-implemented method of claim 7, wherein converting the plurality of communication data files includes applying a first conversion process to a first communication data in the plurality of communication data files, and a second conversion process to second communication data in the plurality of communication data files, the first communication data generated by a first communications program from a first provider, the second communication data generated by a second communications program from a second provider, and the first conversion process different from the second conversion process.

11. The computer-implemented method of claim 7 further comprising accessing human resources data to correlate each of the plurality of communication data files to one or more persons.

12. The computer-implemented method of claim 11, wherein the two or more includes generating the group association data, and generating the group association data further includes correlating each of the plurality of communication data files to one or more groups associated with one or more persons.

13. A non-transitory computer-readable medium comprising one or more program instructions recorded thereon, the instructions configured for execution by a computing system comprising one or more processors in order to cause the computing system to:
   access a plurality of communication data files that are in a plurality of different formats;
   electronically decompress the plurality of communication data files;
   convert the plurality of communication data files into a pre-determined, browser-renderable standard format to create a plurality of formatted communication data files;
   generate lexicon tag data indicating a change in position from an original position of text in an original data file of the plurality of communication data files, the change in the position being caused at least in part by the conversion of the plurality of communication data files into the pre-determined, browser-renderable standard format;
   insert the lexicon tag data into a subset of the plurality of formatted communication data files that are in the pre-determined, browser-renderable standard format;
   process the plurality of formatted communication data files to generate a plurality of revised formatted communication data files by performing two or more of the following:
      removing duplicate data among the plurality of formatted communication data files;
      generating thread data for at least the subset of the plurality of formatted communication data files;
      removing, from the plurality of formatted communication data files, data that meets pre-identified blacklisted criteria; or
      generating group association data for the plurality of formatted communication data files;
   store the plurality of revised formatted communication data files in non-transitory memory; and
   transmit at least the lexicon tag data for rendering in a browser.

14. The non-transitory computer-readable medium of claim 13, wherein the two or more includes generating the group association data, and the generated group association data indicates one or more groups associated with one or more persons who correspond to data files.

15. The non-transitory computer-readable medium of claim 13, wherein converting the plurality of communication data files includes applying a first conversion process to email data in the plurality of communication data files and a second conversion process to a different type of communication data in the plurality of communication data files, the first conversion process different from the second conversion process.

16. The non-transitory computer-readable medium of claim 13, wherein converting the plurality of communication data files includes applying a first conversion process to a first communication data in the plurality of communication data files, and a second conversion process to second communication data in the plurality of communication data files, the first communication data generated by a first communications program from a first provider, the second communication data generated by a second communications program from a second provider, and the first conversion process different from the second conversion process.

17. The non-transitory computer-readable medium of claim 13 further comprising accessing human resources data to correlate each of the plurality of communication data files to one or more persons.

18. The non-transitory computer-readable medium of claim 17, wherein the two or more includes generating the group association data, and generating group association data further includes correlating each of the plurality of communication data files to one or more groups associated with one or more persons.

19. The computing system of claim 1, wherein the two or more of the following are performed in parallel.

20. The computing system of claim 1, wherein at least one of generating the lexicon tag data or inserting the lexicon tag data is performed in parallel with the two or more of the following.

21. The computer-implemented method of claim 7, wherein the two or more of the following are performed in parallel.

22. The computer-implemented method of claim 7, wherein at least one of generating the lexicon tag data or inserting the lexicon tag data is performed in parallel with the two or more of the following.

23. The non-transitory computer-readable medium of claim 13, wherein the two or more of the following are performed in parallel.

* * * * *

UNITED STATES PATENT AND TRADEMARK OFFICE
CERTIFICATE OF CORRECTION

PATENT NO. : 10,362,133 B1
APPLICATION NO. : 14/750773
DATED : July 23, 2019
INVENTOR(S) : Maag et al.

Page 1 of 1

It is certified that error appears in the above-identified patent and that said Letters Patent is hereby corrected as shown below:

On the Title Page

Item (72), (Inventors), Lines 2-3, Change "Peter Tosirisuk, Oakland, CA (US)" to --Sarun Peter Tosirisuk, Oakland, CA (US)--.

Signed and Sealed this
Eighth Day of October, 2019

Andrei Iancu
*Director of the United States Patent and Trademark Office*